(12) United States Patent
Burnett

(10) Patent No.: US 10,767,879 B1
(45) Date of Patent: Sep. 8, 2020

(54) CONTROLLING AND MONITORING INDOOR AIR QUALITY (IAQ) DEVICES

(71) Applicant: Gregg W Burnett, Royse City, TX (US)

(72) Inventor: Gregg W Burnett, Royse City, TX (US)

( * ) Notice: Subject to any disclaimer, the term of this patent is extended or adjusted under 35 U.S.C. 154(b) by 0 days.

(21) Appl. No.: 15/456,555

(22) Filed: Mar. 12, 2017

Related U.S. Application Data

(63) Continuation-in-part of application No. 14/180,157, filed on Feb. 13, 2014, now Pat. No. 9,593,861.

(51) Int. Cl.
*F24F 11/30* (2018.01)
*F24F 3/14* (2006.01)
(Continued)

(52) U.S. Cl.
CPC ............. *F24F 11/30* (2018.01); *F24F 3/14* (2013.01); *G05B 19/048* (2013.01);
(Continued)

(58) Field of Classification Search
CPC .......... F24F 11/0017; F24F 2011/0023; F24F 2011/0071; F24F 2011/0091
See application file for complete search history.

(56) References Cited

U.S. PATENT DOCUMENTS 3,951,625 A * 4/1976 Follette .................... F24F 3/14
236/44 C
4,633,704 A * 1/1987 Tantram ............. G01N 33/0011
204/415
(Continued)

FOREIGN PATENT DOCUMENTS

CN 101380482 B 5/2012
CN 203139888 U 8/2013
(Continued)

OTHER PUBLICATIONS

Smart Contractor Products, "Smart HVAC Products," Retrieved from http://www.smarthvacproducts.com/product/air-filter-monitor on Feb. 14, 2014, (2 pages).
(Continued)

*Primary Examiner* — Henry T Crenshaw
(74) *Attorney, Agent, or Firm* — Fogarty LLP

(57) ABSTRACT

An intelligent digital assistant device receives an indication of an installation status of a consumable component of an Indoor Air Quality (IAQ) component. The IAQ component configured to alter the quality of air entering, leaving, or circulating within a building via an HVAC system, wherein the installation status of the consumable component is determined by a component sensor coupled to the IAQ component and transmitted to the wireless user device via a wireless transmitter integrated in the IAQ component. The intelligent digital assistant device receives information regarding properties of the consumable component, wherein the properties of the consumable component are determined by the component sensor and transmitted to the intelligent digital assistant device via the wireless transmitter of the IAQ component. The intelligent digital assistant device monitors the properties of the consumable component, and notifies a user when the consumable component requires maintenance or replacement.

19 Claims, 5 Drawing Sheets

(51) Int. Cl.
*G05B 19/048* (2006.01)
*G05B 23/02* (2006.01)
*F24F 3/16* (2006.01)
*F24F 11/63* (2018.01)
*F24F 140/50* (2018.01)
*F24F 11/52* (2018.01)
*F24F 11/39* (2018.01)

(52) U.S. Cl.
CPC .......... *G05B 23/0283* (2013.01); *F24F 11/39* (2018.01); *F24F 11/52* (2018.01); *F24F 11/63* (2018.01); *F24F 2003/1667* (2013.01); *F24F 2003/1682* (2013.01); *F24F 2140/50* (2018.01); *G05B 2219/2614* (2013.01)

(56) References Cited

U.S. PATENT DOCUMENTS

| | | | |
|---|---|---|---|
| 4,805,519 A | 2/1989 | Boddey et al. | |
| 6,206,775 B1* | 3/2001 | Lemaitre | B60H 1/008 139/158 |
| 6,553,336 B1* | 4/2003 | Johnson | G01D 3/022 702/188 |
| 6,868,293 B1 | 3/2005 | Schur et al. | |
| 7,178,410 B2 | 2/2007 | Fraden et al. | |
| 7,490,512 B2 | 2/2009 | Fraden | |
| 7,600,388 B2 | 10/2009 | Vestal | |
| 7,772,566 B2 | 8/2010 | Lee | |
| 9,593,861 B1* | 3/2017 | Burnett | F24F 11/30 |
| 2003/0040915 A1* | 2/2003 | Aubauer | G10L 15/063 704/275 |
| 2005/0000365 A1 | 1/2005 | Nelsen et al. | |
| 2005/0023482 A1* | 2/2005 | Schulz | C02F 1/325 250/432 R |
| 2005/0097478 A1 | 5/2005 | Killian et al. | |
| 2005/0119794 A1* | 6/2005 | Amundson | G05D 23/1902 700/276 |
| 2005/0188853 A1 | 9/2005 | Scannell, Jr. | |
| 2006/0141466 A1* | 6/2006 | Pinet | G01N 21/23 435/6.11 |
| 2006/0283965 A1 | 12/2006 | Mueller et al. | |
| 2007/0106414 A1* | 5/2007 | Strohband | B62D 65/005 700/116 |
| 2010/0044319 A1* | 2/2010 | Engel | A61L 9/20 210/746 |
| 2010/0107071 A1* | 4/2010 | Pavlak | F24F 11/30 715/702 |
| 2010/0126943 A1 | 5/2010 | Lee | |
| 2010/0288468 A1* | 11/2010 | Patel | B01D 46/10 165/59 |
| 2011/0115664 A1 | 5/2011 | Belz et al. | |
| 2011/0260903 A1 | 10/2011 | Wong | |
| 2012/0196524 A1 | 8/2012 | Williams et al. | |
| 2012/0253523 A1 | 10/2012 | Harrod et al. | |
| 2012/0304866 A1 | 12/2012 | Barrett | |
| 2012/0319851 A1* | 12/2012 | Hoglund | G08B 21/18 340/607 |
| 2013/0134781 A1 | 5/2013 | Kang et al. | |
| 2013/0173064 A1* | 7/2013 | Fadell | G05D 23/1902 700/276 |
| 2013/0197829 A1 | 8/2013 | Sherman, III et al. | |
| 2013/0226352 A1 | 8/2013 | Dean-Hendricks et al. | |
| 2014/0031989 A1* | 1/2014 | Bergman | G05D 23/1905 700/276 |
| 2014/0190679 A1* | 7/2014 | Roosli | F24F 13/20 165/237 |
| 2014/0244047 A1* | 8/2014 | Oh | G08B 19/00 700/278 |
| 2015/0254958 A1 | 9/2015 | Sherman et al. | |

FOREIGN PATENT DOCUMENTS

| | | |
|---|---|---|
| JP | 2012107849 A | 6/2012 |
| KR | 1020100082616 A | 7/2010 |
| KR | 1020130019155 A | 2/2013 |

OTHER PUBLICATIONS

Willette, Chris, "Introduction to Use of UV Light for the Control of Air Handler Contamination", 2002 Triatomic Environmental, Inc., 5 pages.

Fraden, et al., "Clogging detector for air filter," U.S. Appl. No. 60/555,011, filed Mar. 22, 2004, pp. 13.

Fraden; Jacob, "Ceaner for medical probe," U.S. Appl. No. 60/841,663, filed Sep. 1, 2006, pp. 17.

* cited by examiner

US 10,767,879 B1

CONTROLLING AND MONITORING INDOOR AIR QUALITY (IAQ) DEVICES

CROSS-REFERENCE TO RELATED APPLICATIONS

This application is a continuation-in-part of and claims the benefit of the filing date of U.S. patent application Ser. No. 14/180,157, which is titled "Controlling and Monitoring Indoor Air Quality (IAQ) Devices" and was filed Feb. 13, 2014, the disclosure of which is hereby incorporated by reference herein in its entirety.

TECHNICAL FIELD

Embodiments disclosed herein are directed, in general, to indoor air quality devices and, more specifically, to systems and methods for controlling and monitoring Indoor Air Quality (IAQ) devices.

BACKGROUND

Heating, ventilation, and/or air conditioning (HVAC) systems are often used to control the ambient temperature within buildings, houses, or other structures. Modern HVAC systems include a controller or thermostat configured to control one or more components of the HVAC system. For example, a typical thermostat may be used to turn on a fan, set the indoor temperature, or to schedule the system's usage over the course of a day, week, or month. Furthermore, some HVAC systems may also include one or more Indoor Air Quality (IAQ) devices that are useful for regulating the indoor air quality within the building.

The inventor hereof has recognized, however, that a conventional HVAC controller is not configured to monitor or control IAQ devices. For example, there is currently no way in which a user can determine the status of a media air filter or ultraviolet light source within an IAQ device in an automated or remote fashion.

Intelligent digital assistants are available to many people via their mobile phone, smart phone, tablet, kiosk, a computer, or other voice-controlled devices. Siri® is an intelligent personal assistant service that has been an integral part of Apple, Inc.'s operating system since iOS 5 and was launched as an iPhone® feature in October 2011. Alexa™ is a voice agent from Amazon.com, Inc. that was introduced in November 2014 with the Amazon Echo® smart speaker. The Alexa™ service is also available as a software application that is supported by other devices, such as the iPhone®. In January 2015, Microsoft Corporation announced the availability of the Cortana™ digital agent for the Windows 10 operating system on desktops and mobile devices. Other intelligent digital assistants are available from and being developed by other companies with similar features.

Users access their digital assistant in different ways depending upon the service and device. Apple's Siri® service is activated by speaking "Hey Siri." The Alexa™ service allows the user to select from a list of wake words (e.g., "Alexa," "Echo," "Amazon," "Computer") that are spoken to activate the service. Microsoft's Cortana™ service is activated by speaking "Hey Cortana." The user typically states a command or request along with the access word(s) and the digital assistant responds by generating a spoken response, launching a website, presenting information, or some other action, such as initiating a text message. The Cortana™ service also allows the user to type a request or question in a search box on desktop or laptop computers.

Existing digital assistants allow users control their thermostat, such as by using Alexa on an Amazon Echo to set temperatures on a Nest® environment control system.

SUMMARY

Embodiments disclosed herein are directed to systems and methods for controlling and monitoring Indoor Air Quality (IAQ) devices. In an illustrative, non-limiting embodiment, a system may include an IAQ component configured to alter the quality of the air entering, leaving, or circulating within a building, a sensor coupled to the IAQ component, the sensor configured to determine a status of the IAQ component, and a transmitter coupled to the sensor, the transmitter configured to transmit an indication of the status to a controller.

In some implementations, the IAQ component may include a media air filter and the sensor may include a temperature sensor coupled to the media air filter. In other implementations, the IAQ component may include an ultraviolet (UV) light source and the sensor includes a voltage or current detector coupled to a ballast configured to power the UV light source. In yet other implementations, the IAQ component may include a humidifier, a dehumidifier, or an electronic air cleaner.

The status may include at least one of: whether the IAQ component is present, whether the IAQ component is functioning properly, or an expected remaining lifespan of the IAQ component. The transmitter may include a wireless transmitter configured to implement a WiFi (IEEE 802.11), BLUETOOTH, ZIGBEE, ECOBEE, RED LINK, or WEAVE protocol. In some cases, the controller may include a Heating, Ventilation, and/or Air Conditioning (HVAC) thermostat. Additionally or alternatively, the controller may include a network router or modem.

In yet another illustrative, non-limiting embodiment, a computer system may include a processor and a memory coupled to the processor, the memory having program instructions stored thereon that, upon execution by the processor, cause the system to receive an indication of a status of an IAQ component, the IAQ component configured to configured to alter the quality of the air entering, leaving, or circulating within a building, wherein the status is determined by a sensor coupled to the IAQ component and transmitted to the system, at least in part, via a wireless transmitter. The computer system may be further configured to display the indication to a user.

For example, the computer system may include a mobile device, tablet, laptop, or personal computer. The IAQ component may include a media air filter and the sensor may include a temperature sensor coupled to the media air filter. The status may include an indication of a level of airflow obstruction of the media air filter, the level of airflow obstruction determined based upon a temperature captured by the temperature sensor. The IAQ component may include an ultraviolet (UV) light source and the sensor include may a voltage or current detector coupled to a ballast configured to power the UV light source. Also, the status may include an indication of an expected remaining lifespan of the UV light source determined based upon a voltage or current determined by the voltage or current detector.

In yet another illustrative, non-limiting embodiment, a method may include receiving, at an HVAC thermostat, data from a sensor coupled to an IAQ component configured to alter the quality of the air entering, leaving, or circulating within a building, and determining, by the HVAC thermostat, a status of the IAQ component based upon the data.

In some cases, the IAQ component may include a media air filter, the data may include temperature, and the status may include a level of airflow of the media air filter. In other cases, the IAQ component may include an UV light source, the data may include a voltage or current, and the status may include an expected remaining lifespan of the UV light source. The method may further include transmitting, by the HVAC thermostat, an indication of the status to a computer system.

In still another illustrative, non-limiting embodiment, a system may include one or more sensors configured to monitor a replaceable component in an IAQ device and to report a status of the replaceable component using a wireless communication protocol. For example, the one or more sensors may include at least one of a: temperature sensor, a pressure sensor, an airflow sensor, a noise or sound sensor, a humidity sensor, an electromagnetic radiation sensor, a bioaresosol sensor, or a Volatile Organic Compounds (VOC) sensor. The replaceable component may include a media air filter or an UV light source. Further, the wireless communication protocol may include a WiFi, BLUETOOTH, ZIGBEE, ECOBEE, RED LINK, or WEAVE protocol.

In various embodiments, one or more of the techniques described herein may be performed using one or more thermostats, HVAC controllers, computer systems, mobile devices, tablets, etc. In other various embodiments, a tangible computer-readable storage medium may have program instructions stored thereon that, upon execution by one or more of the aforementioned systems, cause the system(s) to execute one or more operations disclosed herein. In yet other various embodiments, a system may include at least one processor and memory coupled to the at least one processor, the memory configured to store program instructions executable by the at least one processor to cause the system to execute one or more operations disclosed herein.

An example system comprises an Indoor Air Quality (IAQ) component configured to alter the quality of air entering, leaving, or circulating within a building via an HVAC (Heating, ventilation, and/or air conditioning) system, wherein the IAQ component comprises a consumable component. A component sensor is integrated into the IAQ component, wherein the component sensor is configured to determine properties of the consumable component. One or more transmitters are coupled to the component sensor, wherein the one or more transmitters are configured to transmit the properties of the consumable component. An intelligent digital assistant is coupled to the HVAC system and configured to monitor a consumable component installation status and one or more of the properties of the consumable component, and wherein the intelligent digital assistant is further configured to notify a user when the consumable component requires maintenance or replacement.

The system may further comprise one or more airflow sensors configured to determine properties of airflow within the HVAC system. One or more transmitters are coupled to the airflow sensors, wherein the one or more transmitters are configured to transmit airflow properties, wherein the intelligent digital assistant further determines lifespan information for the consumable component based on the airflow properties.

The intelligent digital assistant may be further configured to order a replacement for the consumable component. The intelligent digital assistant may be further configured to schedule service or maintenance for the consumable component. The intelligent digital assistant periodically evaluates the health of the consumable component to determine if maintenance or replacement is required. The intelligent digital assistant may evaluate the health of the consumable component to determine if maintenance or replacement is required in response to a user request.

The consumable component may include a media air filter or an ultraviolet (UV) light source. The sensor may include a voltage or current detector coupled to a ballast configured to power the UV light source. The IAQ component may include a humidifier, a dehumidifier, or an electronic air cleaner, a ventilation fan, or an ionizer. The installation status indicates that the consumable component is detected and, is functioning properly.

An intelligent digital assistant device comprises a processor and a memory coupled to the processor. The memory having program instructions stored thereon that, upon execution by the processor, cause the intelligent digital assistant device to receive an indication of an installation status of a consumable component of an Indoor Air Quality (IAQ) component, the IAQ component configured to alter the quality of air entering, leaving, or circulating within a building via an HVAC (Heating, ventilation, and/or air conditioning) system, wherein the installation status of the consumable component is determined by a component sensor coupled to the IAQ component and transmitted to the wireless user device, at least in part, via a wireless transmitter integrated in the IAQ component, receive information regarding one or more properties of the consumable component, wherein the properties of the consumable component are determined by the component sensor and transmitted to the intelligent digital assistant device, at least in part, via the wireless transmitter of the IAQ component, monitor a consumable component installation status and the one or more of the properties of the consumable component, and notify a user when the consumable component requires maintenance or replacement.

BRIEF DESCRIPTION OF THE DRAWINGS

Figure 1:
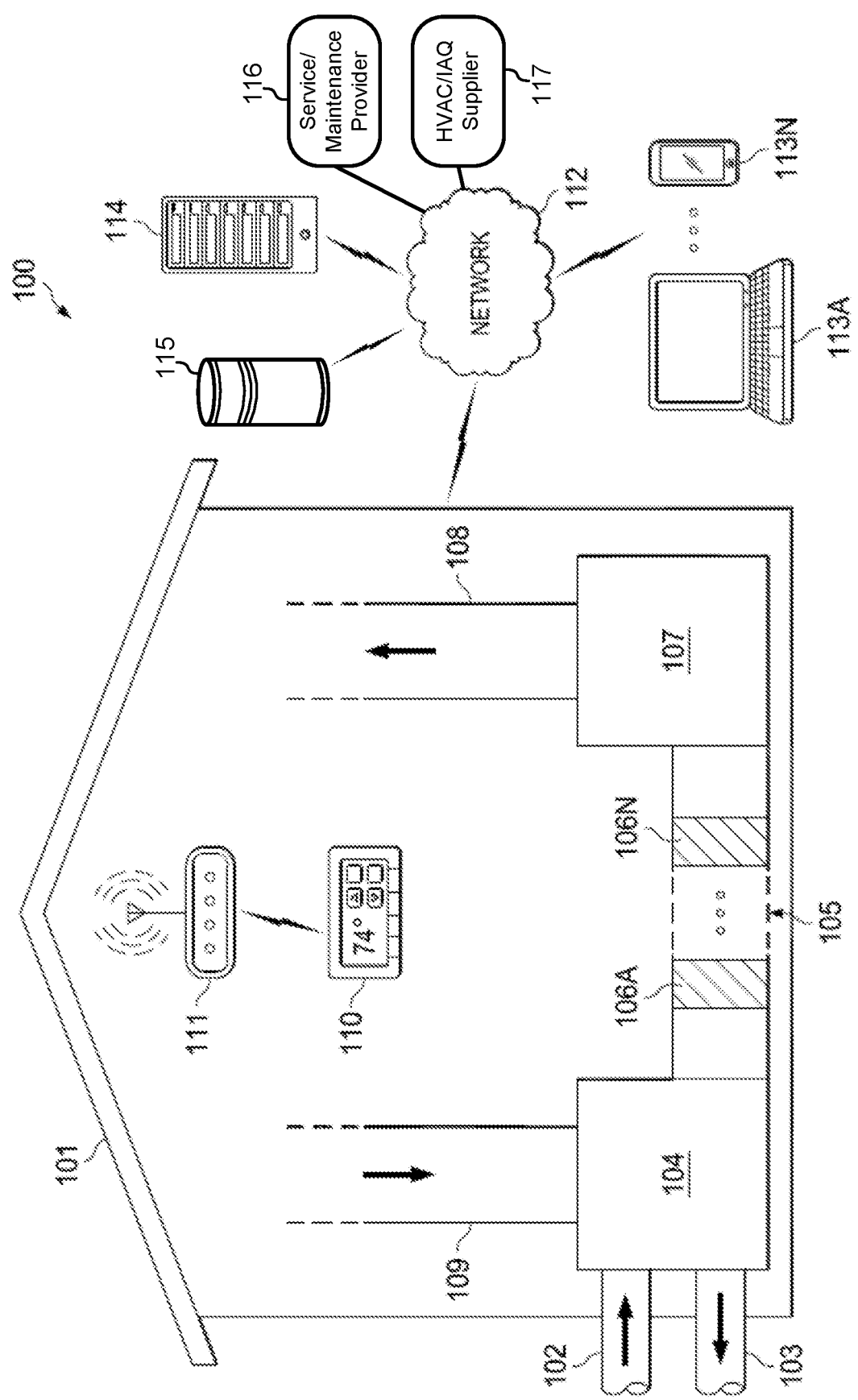

Having thus described the invention in general terms, reference will now be made to the accompanying drawings, which are not necessarily drawn to scale, and wherein:

FIG. 1 is a diagram of an environment where systems and methods for controlling and monitoring Indoor Air Quality (IAQ) devices may be used according to some embodiments.

Figure 2:
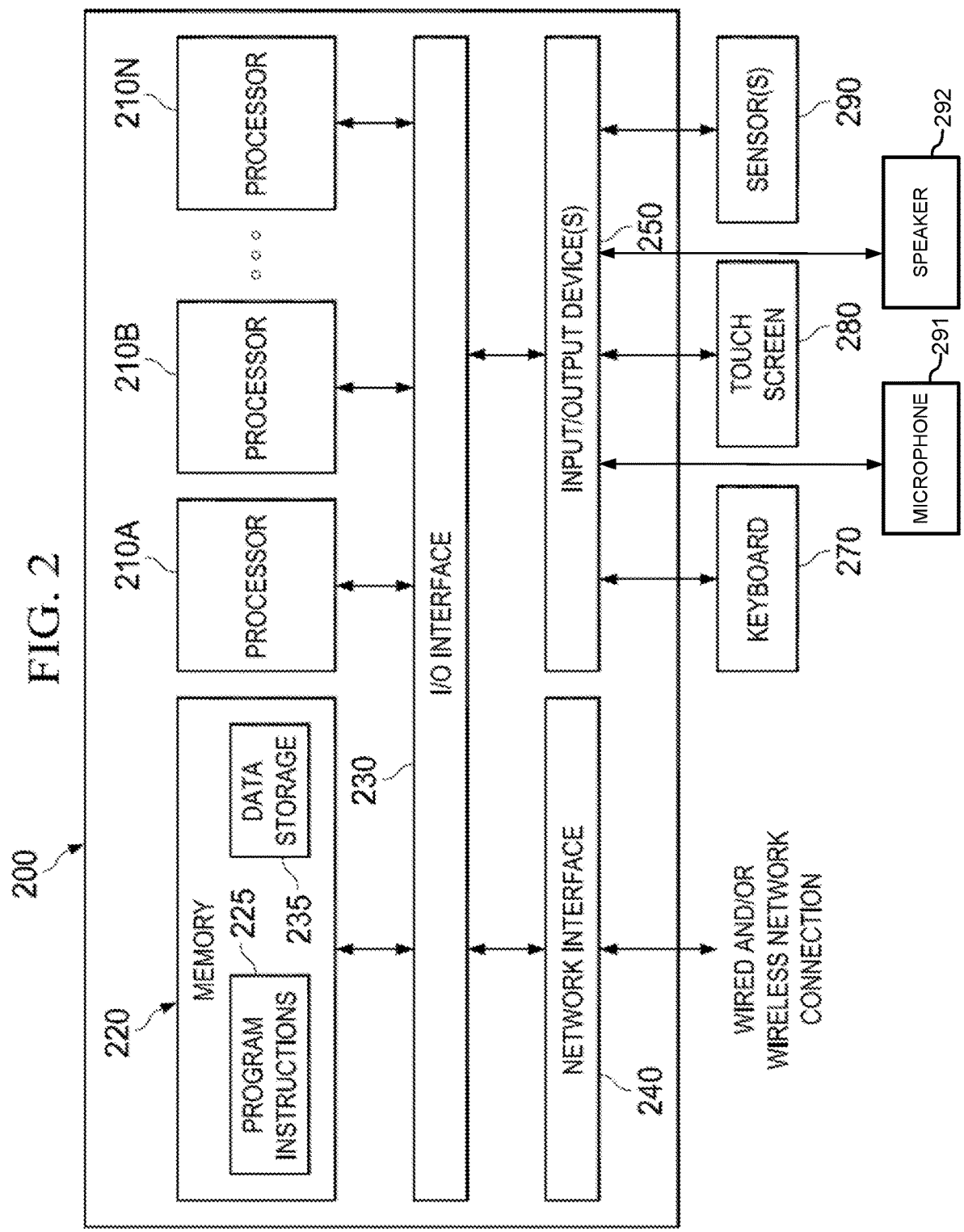

FIG. 2 is a block diagram of a computer system adapted for use with systems and methods for controlling and monitoring IAQ devices according to some embodiment.

Figure 3:
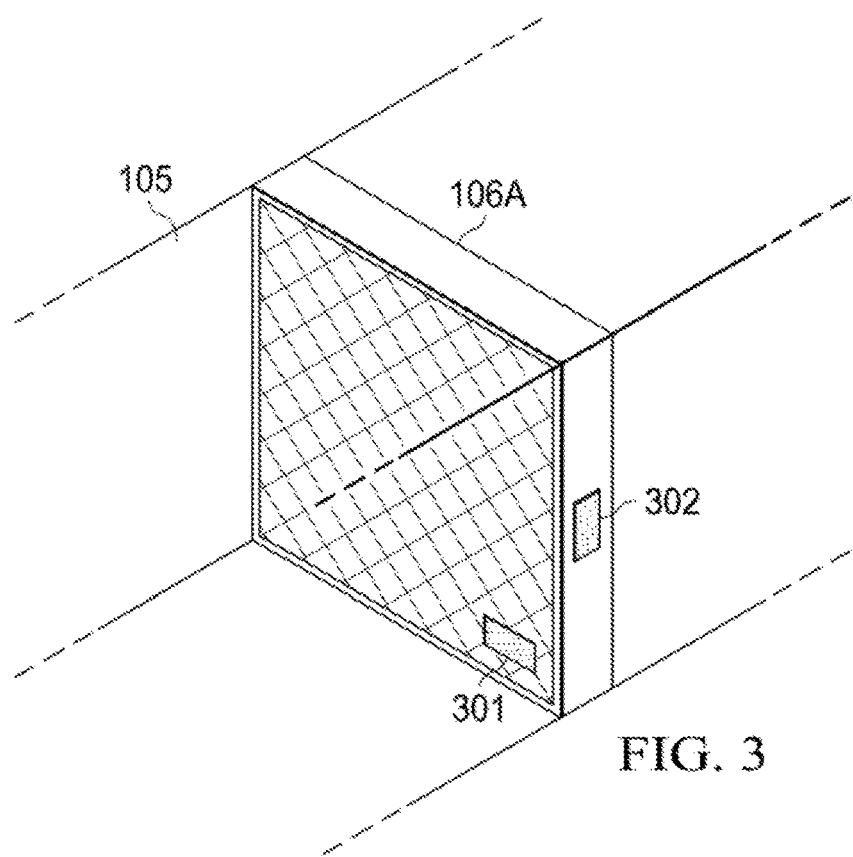

FIG. 3 is a diagram of a media air filter monitoring system according to some embodiments.

Figure 4:
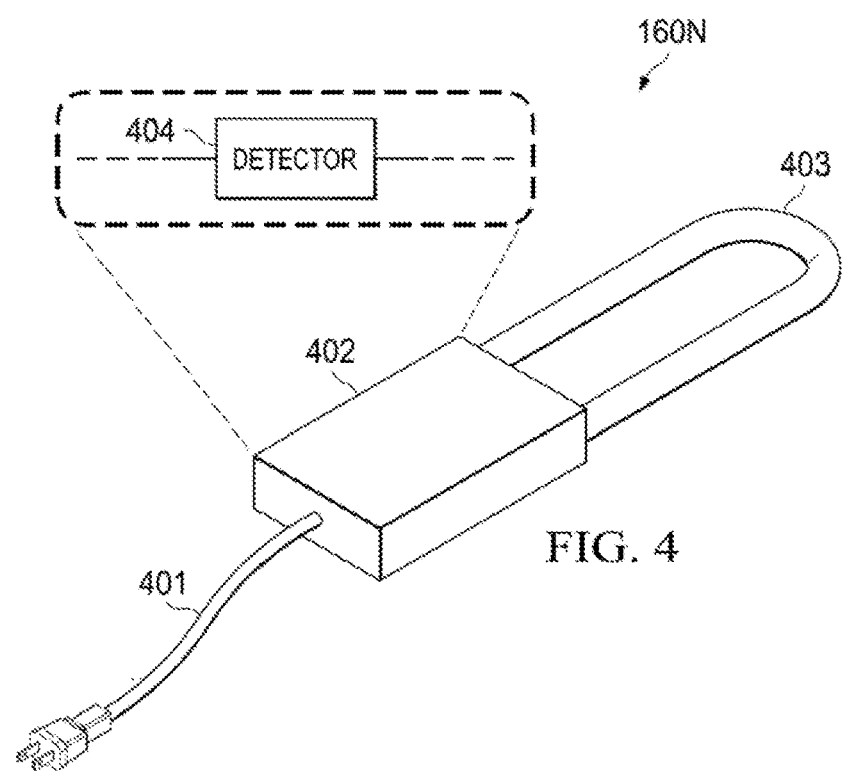

FIG. 4 is a diagram of an ultraviolet (UV) light source according to some embodiments.

Figure 5:
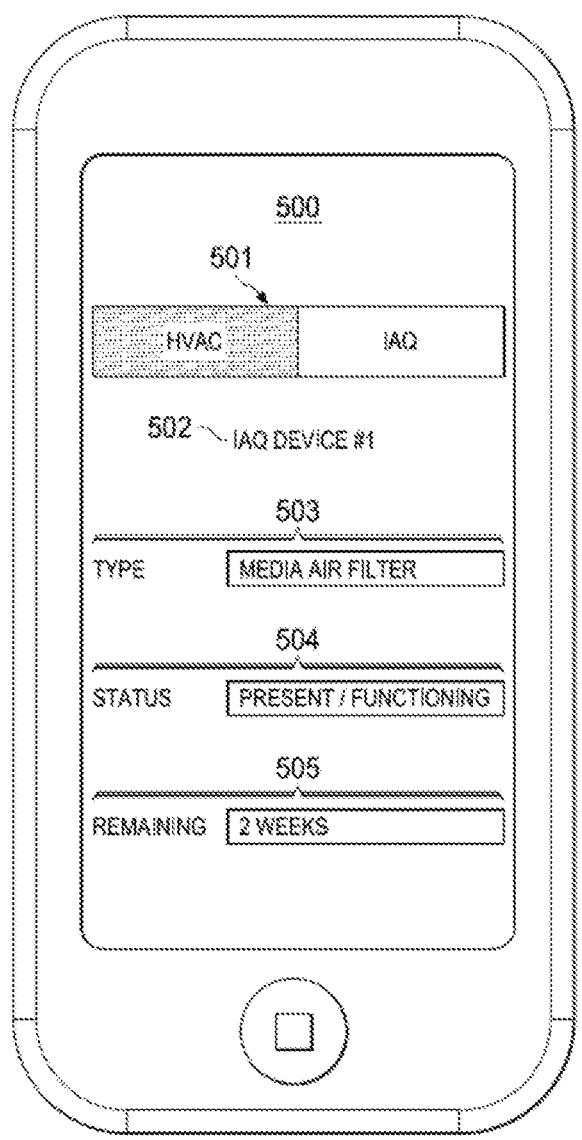

FIG. 5 is a screenshot of a Graphical User Interface (GUI) according to some embodiments.

Figure 6:
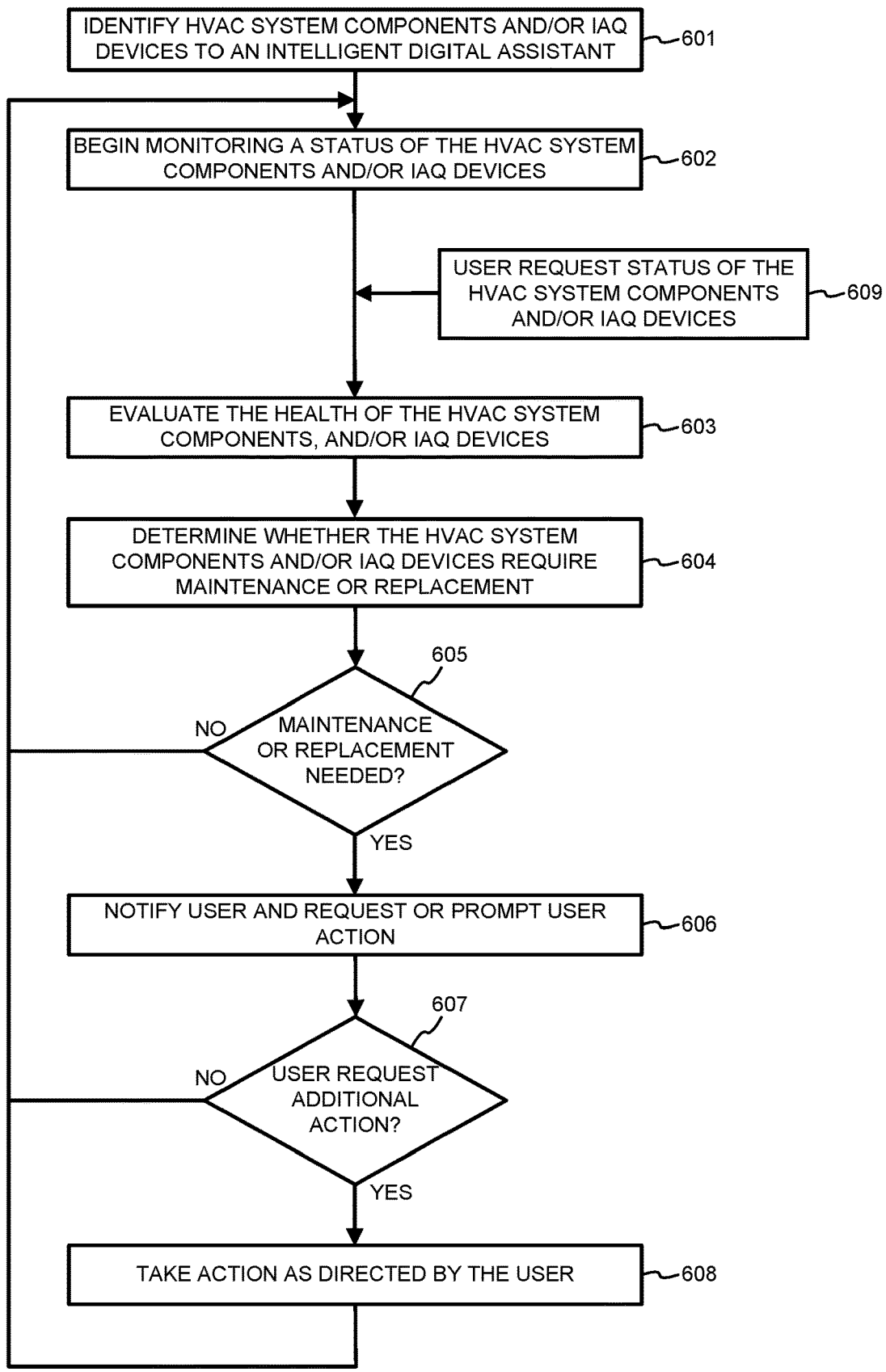

FIG. 6 is a flowchart illustrating a method for using an intelligent digital assistant to interact with and to monitor an HVAC system and its components.

DETAILED DESCRIPTION

Embodiments disclosed herein relate to systems and methods for controlling and monitoring Indoor Air Quality (IAQ) devices. Examples of IAQ devices include, but are not limited to, humidifiers, dehumidifiers, media air cleaners or filters, electronic air cleaners, air ionizers, ultraviolet (UV) air treatment devices or coils, bypass HEPA air filters, energy recovery ventilators (ERV), heat recovery ventilators (HRV), electronically enhanced air filters, photo catalytic air purifiers, forced air zoning devices, etc. Accordingly, the term "IAQ device," as used herein, is intended to distinguish the aforementioned types of devices from conventional Heating, Ventilation, and Air Conditioning (HVAC) devices, such as compressors, fans, heaters, coolers, etc.

FIG. 1 is a diagram of environment 100 where systems and methods for controlling and monitoring IAQ devices or components may be used. In some embodiments, a building, house, or other structure 101 may include a Heating, Ventilation, and Air Conditioning (HVAC) system. Although FIG. 1 shows a conventional forced air type HVAC system, it should be noted that other types of HVAC systems may include, for example, boiler systems, radiant heating systems, electric heating systems, cooling systems, heat pump systems, and/or any other suitable type of HVAC system. Moreover, in some implementations, one or more IAQ devices or components may be used as standalone devices that are used outside of the context of, or used independently from, an HVAC system.

The HVAC system of FIG. 1 includes HVAC component 107, a system of ductwork and air vents including supply air duct 108 and return air duct 109, and HVAC controller or thermostat 110. HVAC component 107 may include, for instance, a furnace, a heat pump, an electric heat pump, a geothermal heat pump, an electric heating unit, an air conditioning unit, a ventilation unit, etc.

In various implementations HVAC controller or thermostat 110 may be configured to control air temperature within building or structure 101 by activating and deactivating HVAC component 107 in a controlled manner. HVAC controller or thermostat 110 may be configured to control the HVAC component 107 via wired or wireless communications. HVAC controller or thermostat 110 may communicate with HVAC component 107 following a wireless protocol such as cellular communication, ZIGBEE, BLUETOOTH, WiFi, ECOBEE, RED LINK, WEAVE or any other suitable wireless protocol. For example, thermostat 110 may be an ecobee Smart Thermostat® or a Nest Learning Thermostat™, or thermostat 110 may be part of a RedLINK™ Comfort System from Honeywell International, Inc.

In some cases, the HVAC controller or thermostat 110 may be a wall mountable thermostat or the like. Such a thermostat may include or have access to a temperature sensor configured to sense an ambient temperature at or near the thermostat. In some instances, HVAC controller or thermostat 110 may be a zone controller, or may include multiple zone controllers each monitoring and/or controlling the comfort level within a particular zone in the building or other structure.

HVAC component 107 may provide heated and/or cooled air via ductwork 108 throughout building 101. In operation, HVAC controller or thermostat 110 provides a signal to HVAC component 107 to supply heated or cooled air to one or more rooms and/or zones within the building 110 via supply air ducts 108. A blower or fan (not shown) may force heated air through supply air duct 108 by a blower or fan. In this example, air from each zone may be returned to the HVAC component 107 via return air ducts 109.

In some cases, ventilation unit 104 may draw outside air into the building via outside air intake 102 and at the same time expel inside air via inside air outlet 103. As such, ventilation unit 104 may include additional fans and/or blowers to facilitate the exchange of stale air from within building 101 with fresh air supplied from the outside. Ventilation unit 104 may include its own ventilation controller (not shown) that may receive ventilation commands from, for example, HVAC controller or thermostat 110 and, in response, may activate and/or deactivate the various components within ventilation unit 104 to implement those commands.

In some cases, ventilation unit 104 may be controlled according to a predetermined schedule or predetermined set point stored in HVAC controller or thermostat 110. As such, HVAC controller 110 may be configured to allow a user to select certain time periods in which ventilation unit 104 will operate or not operate and/or its speed.

In addition to providing basic airflow and air temperature controls for conventional elements 102-105 and 107-109, the HVAC system may also include any number of Indoor Air Quality (IAQ) devices or components 106A-N capable of improving and/or altering the quality of the air circulating within structure 101. In some cases, one or more of IAQ devices 106A-N may be coupled to the HVAC system via ductwork 105. In other cases, one or more of IAQ devices 106A-N may be integrated into or otherwise coupled to other HVAC components such as components 104 or 107, or may be standalone devices.

In various implementations, each of IAQ devices 106A-N may have one or more sensors configured to detect the device's presence, status, operational conditions, or any other information related to that device such as, for example, the status of components (e.g., performance components) that require maintenance or replacement. To detect the foregoing, these sensors may be equipped to measure any number of parameters over time including, but not limited to, temperature, pressure, airflow, noise, sounds (audible and/or inaudible), voltage, current, resistance, capacitance, humidity, electromagnetic radiation (visible and/or invisible), bioaresosols, Volatile Organic Compounds (VOCs), other airborne components, and the like. These parameters may provide a direct indication of the status of an IAQ device (e.g., the current drawn by a photo catalytic device, or the light generated by an ultraviolet (UV) light source). Alternatively, the parameters may provide an indirect indication from which the status of the IAQ device may be inferred (e.g., changes in airflow or VOCs downstream of an air filter). The values of these parameters can then be used to determine if the IAQ device is operating and/or requires maintenance or replacement.

These sensors on IAQ devices 106A-N may be operably coupled to HVAC controller or thermostat 110 via a wireless link. For example, the sensors may have a transceiver and/or antenna that provides communication via publicly available (e.g., WiFi) or proprietary wireless protocol. In other embodiments, other active or passive communication technologies, such as Radio Frequency ID (RFID), may be used. As such, each of IAQ devices 106A-N may be detectable by HVAC controller or thermostat 110, and other information about IAQ devices 106A-N previously unknown to a user (absent manual and/or visual inspection) may be made available through HVAC controller or thermostat 110.

In one embodiment, a user may manually identify the IAQ devices 106A-N to router, modem, or gateway 111 and/or to HVAC controller or thermostat 110, such as by "pairing" of wireless devices. Such manual pairing would allow the user to selectively determine which IAQ devices 106A-N are connected, monitored, and/or controlled and may increase system security through the use of optional passwords, passcodes, etc. to complete the pairing. In other embodiments, router, modem, or gateway 111 and/or to HVAC controller or thermostat 110 may automatically detect the wireless sensors on IAQ devices 106A-N. For example, the wireless sensors may broadcast identification and status information that allows the router, modem, or gateway 111 and/or to HVAC controller or thermostat 110 to detect the IAQ devices with or without wireless pairing. The wireless sensors on the IAQ devices may broadcast or transmit information such as the manufacturer, make, model, serial number, version, status, etc. Upon detection of this information, the IAQ device may be paired to and/or monitored by router, modem, or gateway 111 and/or to HVAC controller or thermostat 110. Optionally, the user may confirm such automatic detection to ensure that the detected IAQ device is part of the user's system and not in a neighboring building or system.

Router, modem, or gateway 111 may be in communication with HVAC controller or thermostat 110 and it may allow HVAC controller or thermostat 110 to access network 112. For example, network 112 may include any suitable public or private, wired or wireless computer network including, but not limited to, the Internet, a wireless local area network (WLAN), a wide area network (WAN), etc. As such, user devices 113A-N (e.g., desktops, laptops, tablets, mobile phones, smartphones, smart watches, smart glasses, etc.) may be able to access HVAC controller or thermostat 110 remotely to retrieve information about IAQ devices 106A-N and/or to control aspects of their operation. Moreover, server 114 may be accessible to HVAC controller or thermostat 110 to provide information related to IAQ devices 106A-N, such as discovery information or the like. These, and other features, are discussed in more detail below.

In other embodiments, HVAC controller or thermostat 110 and router, modem, or gateway 111 may be part of a single device User devices 113A-N may function as digital assistant by providing a platform for a digital assistant service, such as the Apple Siri® service or Microsoft Cortana™ service. Alternatively, a stand-alone device 115, such as an Amazon Echo®, for example, may provide digital assistant services. It will be understood that existing digital assistant devices referenced herein are listed as representative examples only and are not intended to limit the devices and services that can be used with the embodiments disclosed herein.

Stand-alone digital assistant device 115 may access router, modem, or gateway 111 through network 112. For example, digital assistant device 115 may communicate with router, modem, or gateway 111 across network 112 using the WiFi (IEEE 802.11) protocol. This allows digital assistant device 115 or digital assistant services running on user devices 113A-N to access HVAC controller or thermostat 110 and to retrieve information about IAQ devices 106A-N and/or to control aspects of their operation.

Additionally, the digital assistant device 115 may be in communication with other entities, such as a service/maintenance provider 116 or a HVAC/IAQ provider. This allows the digital assistant device 115 to schedule service or maintenance with provider 116 or to order replacement HVAC/IAQ parts or supplies from provider 117.

Prior digital assistant devices and services are only able to perform temperature-related operations, such as setting a thermostat temperature or asking for the current temperature in a house. Embodiments described herein expand the capabilities of digital assistants and allow for the digital assistant to provide feedback to the user regarding the current status of the HVAC system components and consumables.

FIG. 2 is a block diagram of a computer system adapted for use with systems and methods for controlling and monitoring IAQ devices according to some embodiments. In various embodiments, system 200 may be a server, a workstation, a desktop computer, a laptop, a tablet computer, a mobile device, a smart phone, digital assistant device, or the like. In some cases, system 200 may be adapted to implement HVAC controller or thermostat 110, router 111, user devices 113A-N, server 114, and/or digital assistant device 115 shown in FIG. 1. As illustrated, computer system 200 includes one or more processor(s) 210A-N coupled to system memory 220 via input/output (I/O) interface 230. Computer system 200 further includes network interface 240 coupled to I/O interface 230, and an interface to one or more input/output devices 250, such as keyboard or input device 270, touchscreen or display 280, sensor(s) 290. Input/output device interface 250 may be coupled to a microphone 291 and speaker 292 to allow users to interact with computer system using voice commands and verbal/spoken feedback.

In various embodiments, computer system 200 may be a single-processor system including one processor 210A or a multi-processor system including two or more processors 210A-N (e.g., two, four, eight, or another suitable number). Processor(s) 210A-N may include any processor capable of executing program instructions. For example, in various embodiments, processor(s) 210A-N may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processor(s) 210A-N may commonly, but not necessarily, implement the same ISA. Also, in some embodiments, at least one processor 210A may be a graphics processing unit (GPU) or other dedicated graphics-rendering device.

System memory 220 may be configured to store program instructions and/or data accessible by processor(s) 210A-N. In various embodiments, system memory 220 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described below, may be stored within system memory 220 as program instructions 225 and data storage 235, respectively. In other embodiments, program instructions and/or data may be received, sent or stored upon different types of computer-accessible media or on similar media separate from system memory 220 or computer system 200. Generally speaking, a computer-accessible medium may include any tangible or non-transitory storage media or memory media such as electronic, magnetic, or optical media—e.g., disk or CD/DVD-ROM coupled to computer system 200 via I/O interface 230. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, I/O interface 230 may be configured to coordinate I/O traffic between processor(s) 210A-N, system memory 220, and any peripheral devices in the device, including network interface 240 or other peripheral interfaces, such as input/output devices 250. In some embodiments, I/O interface 230 may perform any necessary protocol, timing or other data transformations to convert data signals from one component (e.g., system memory 220) into a format suitable for use by another component (e.g., processor(s) 210A-N). In some embodiments, I/O interface 230 may include support for devices attached through various types of peripheral buses, such as a variant of the Peripheral Component Interconnect (PCI) bus standard or the Universal Serial Bus (USB) standard, for example. In some embodiments, the function of I/O interface 230 may be split into two or more separate components, such as a north bridge and a south bridge, for example. In addition, in some embodiments some or all of the functionality of I/O interface 230, such as an interface to system memory 220, may be incorporated directly into processor(s) 210A-N.

Network interface 240 may be configured to allow data to be exchanged between computer system 200 and other devices attached to a network (e.g., telecommunications network 104 of FIG. 1), such as other computer systems, or between nodes of computer system 200. In various embodiments, network interface 240 may support communication via wired or wireless general data networks, such as any suitable type of Ethernet network, for example; via telecommunications/telephony networks such as analog voice networks or digital fiber communications networks; via storage area networks such as FibreChannel SANs, or via any other suitable type of network and/or protocol.

Input/output devices 250 may, in some embodiments, include one or more display terminals, keyboards, keypads, touchpads, scanning devices, RFID readers, NFC readers, voice or optical recognition devices, or any other devices suitable for entering or retrieving data by one or more computer system 200. Multiple input/output devices 250 may be present in computer system 200 or may be distributed on various nodes of computer system 200. In some embodiments, similar input/output devices may be separate from computer system 200 and may interact with one or more nodes of computer system 200 through a wired or wireless connection, such as over network interface 240.

As shown in FIG. 2, memory 220 may include program instructions 225, configured to implement certain embodiments described herein, and data storage 235, comprising various data may be accessible by program instructions 225. In an embodiment, program instructions 225 may include software elements of embodiments illustrated in the above figures. For example, program instructions 225 may be implemented in various embodiments using any desired programming language, scripting language, or combination of programming languages and/or scripting languages (e.g., C, C++, C #, Java™, JavaScript™, Perl, etc.). Data storage 235 may include data that may be used in these embodiments (e.g., recorded communications, profiles for different modes of operations, etc.). In other embodiments, other or different software elements and data may be included.

A person of ordinary skill in the art will appreciate that computer system 200 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system or processor-based configurations.

FIG. 3 is a diagram of a media air filter monitoring system according to some embodiments. In many instances, one or more air filters 106A are examples of IAQ devices that may be used to remove dust and other pollutants from the air inside building 101. Particularly, media air filter 106A may be inserted into a slot, trap, or door of air duct 105, and may filter the air prior to it reaching HVAC component 107 and being distributed within building 101. In other embodiments, however, media air filter 106A may be introduced elsewhere within the HVAC system. Generally speaking, air filter 106A may be designed to improve the indoor air quality within building 101.

In some embodiments media air filter 106A may include an electronic chip or tag 301 (e.g., a Radio Frequency Identification (RFID) tag, a Near Field Communications (NFC) tag, or the like). Electronic chip or tag 301 may include a product number, serial number, or any other suitable identification information that supports automatic discovery by HVAC controller or thermostat 110. Additionally or alternatively, electronic chip or tag 301 may also include a temperature and/or pressure sensing device, such as a thermocouple or thermistor, configured to determine the temperature and/or pressure in the vicinity of air media filter 106A and its variations over time.

Duct 105 may include module 302 configured to communicate with HVAC controller or thermostat 110 via a wired or wireless communication link. In other cases, module 302 may be incorporated or combined with the HVAC controller or thermostat 110. Moreover, module 302 may be configured to detect or communicate with electronic chip or tag 301 of media air filter 106A, to collect information from electronic chip or tag 301, and to provide that information to HVAC controller or thermostat 110.

In some embodiments, HVAC controller or thermostat 110 may use the data from the module 302 to identify the presence and/or type of media air filter 106A, and evaluate the IAQ device's operation and/or performance. For example, HVAC controller or thermostat 110 may receive identification information stored in electronic chip or tag 301 and may determine that a filter is actually installed in the HVAC system. Additionally or alternatively, HVAC controller or thermostat 110 may receive the identification information, may access server 114 to match the identification information to a particular air filter model, and may adjust one or more parameters related to the operation of HVAC component 107 or ventilator 104. For example, when HVAC controller or thermostat 110 determines that media air filter is a more airflow restrictive model, it may increase the fan speed, increase the duration that the fan is turned on, or open additional vents in duct 108 in order to compensate for the decreased airflow. Conversely, when media air filter is less restrictive, HVAC controller or thermostat 110 may decrease the fan speed, decrease the duration that the fan is turned on, or close additional vents. In various embodiments, HVAC controller or thermostat 110 may be configured to make these changes in a manner that is automatic and invisible to the end user.

Additionally or alternatively, HVAC controller or thermostat 110 may compare temperature data collected by electronic chip or tag 301 to determine a current operating performance of media air filter 106A, for example, by measuring a change in a parameter related to the amount of airflow through media air filter 106A to determine an expected remaining lifespan of media air filter 106A (e.g., replacement is expected to be needed in a given number of days, weeks, or months). This information may then be provided to the end user via an interface of the HVAC controller or thermostat 110 and/or via user devices 113A-N.

Additionally or alternatively, electronic chip or tag 301 may include a pressure sensor, and airflow and/or airflow restriction sensor (e.g., a mass airflow sensor such as a vane meter or the like), a humidity sensor (e.g., a capacitive-type humidity sensor), a noise or sound sensor (e.g., a microphone, piezoelectric transducer, etc.), a photo/image/visual sensor (e.g., a photodiode, a CCD or CMOS sensor, etc.), an oxygen sensor (e.g., a lambda sensor), etc. Each such sensor may be configured to determine: (i) how clogged media air filter 106A is, and/or (ii) how clean the air is upstream and/or downstream from filter 106A. Again, a change over time in any of these parameters, or any suitable combination of parameters, may be used to determine an expected remaining lifespan of media air filter 106A, which may in turn be provided to the end user via an interface of the HVAC controller or thermostat 110 and/or via user devices 113A-N.

FIG. 4 is a diagram of UV light source 106N according to some embodiments. In some implementations, UV source 106N may be part of a photocatalytic IAQ device and it may be configured to generate UV light that illuminates one or more photocatalytic structures, which in turn may be, for example, a hydrated catalytic matrix, such as a hydrated quad-metallic catalyst. When the ultraviolet light impacts the photocatalytic structures, ozone is produced in the catalytic matrix. The catalyst supports a hydroxyl radical reaction with water vapor that results in hydro peroxides, hydroxyl ions, super oxide ions, passive negative ions hydroxides, and ozonide ions. These are highly reactive chemical species. The hydroxyl radicals are very strong oxidizers and will attack organic materials. This creates oxidation that helps to reduce odors, Volatile Organic Compounds (VOCs), airborne viruses, bacteria, mold and other types of air pollution. The quad-metallic catalytic matrix may be comprised of Rhodium, Titanium, Silver and Copper for example. In other embodiments, other combinations of rare and noble metals may be used for the catalytic matrix.

Ultraviolet light source 106N may be, for example, a high-intensity, broad-spectrum ultraviolet bulb or tube. In other embodiments, the ultraviolet source may be a low-pressure fluorescent quartz bulb or a medium pressure amalgam lamp. Ultraviolet light falls in the band of light between 185 nm and 400 nm. There are three distinct bands of light within the ultraviolet spectrum: UV-A, UV-B, and UV-C. Longwave UV light (315 nm to 400 nm), or UV-A, refers to what is commonly called "black light." Midrange UV (280 nm to 315 nm), or UV-B, causes sunburn. Germicidal UV light (185 nm to 280 nm), or UV-C, is effective in microbial control. Research has demonstrated that the most efficient frequency for microbial destruction is between 254 nm and 265 nm within the UV-C band. Germicidal lamps that produce the majority of their output in this range will be the most effective in microbial control/destruction.

As illustrated in FIG. 4, UV light source 106N includes power cord 401, ballast or power source 402, and bulb 403. In some cases, ballast 402 may include a voltage or current detector 404 configured to monitor the voltage and/or current consumption of UV light source 106N over time. Ballast 402 may also include an electronic chip or tag similar to chip or tag 301 in FIG. 3. Depending upon where UV light source 106N is installed, another module similar to module 302 may be deployed to identify the presence and/or specific model of the IAQ device using UV light source 106N.

In some embodiments, HVAC controller or thermostat 110 may receive data provided by module 302 and it may identify the presence of UV light source 106N. Additionally or alternatively, HVAC controller or thermostat 110 may receive data captured by detector 404 and it may determine an expected remaining life of UV light source 106N. Depending upon the expected remaining life of the IAQ device, HVAC controller or thermostat 110 may increase or decrease the fan speed, increase or decrease the duration that the fan is turned on, or open/close additional vents in duct 108 in order to compensate for the decreased radiation emitted by UV lamp 403. Again, in various embodiments, HVAC controller or thermostat 110 may be configured to make these changes in a manner that is automatic and invisible to the end user.

It should be noted that other types of IAQ devices may be used, and therefore different types of sensor may be deployed. For instance, in some cases, an IAQ device may include an air purifier using Photo Catalytic Oxidation (PCO). Accordingly, examples of other parameters that may be measured and/or reported include, but are not limited to, the presence and/or amount of Volatile Organic Compounds (VOCs) and/or a change in electrical current within the device. Other embodiments may include IAQ devices that perform air filtration operations accompanied by measurements of particles downstream from the filtration and/or IAQ devices that include UV treatment accompanied by a measurement of bioaerosols.

FIG. 5 is a screenshot of Graphical User Interface (GUI) 500. In some embodiments, GUI 500 may be rendered under control of an application executed by one of user devices 113A-N of FIG. 1. As shown tabs 501 allow the user to select between the control and/or monitoring of conventional HVAC components (e.g., temperature, schedule, cold, hot, fan, etc.) or the control and/or monitoring of IAQ devices. In this case, the IAQ tab is selected.

Particularly, GUI 500 provides information area 502 regarding "IAQ device #1," which may be any of the aforementioned IAQ devices including those discussed in connection with FIGS. 3 and 4. Area 503 indicates the type of IAQ device being displayed, here a "media air filter." As previously noted, the type of IAQ device may be determined based upon identification information in an electronic chip or tag 301 and/or upon querying of server 114.

Area 504 indicates the status of the IAQ device such as, for example, whether the IAQ device is functioning and/or present in the HVAC system. In some cases, the status may indicate whether the device is properly installed, in need of maintenance or replacement, etc. This type of information may be obtained, for example via sensors installed in the device on near its vicinity. Meanwhile area 505 shows the estimated remaining lifetime of the device, here "2 weeks." Again, this information may be determined, at least in part, by monitoring one or more aspects of the operation of the IAQ device including, but not limited to, temperature, pressure, voltage, current, or other parameters as discussed above.

Instead of using an application as illustrated in FIG. 5 to interact with IAQ devices and an HVAC system, intelligent digital assistants can be used to provide a user interface. For example, the intelligent digital assistant may monitor the status of IAQ devices and other HVAC components and notify the user when the devices or components need to be replaced. Additionally, the intelligent digital assistant may order replacement parts and schedule an installation professional, if needed.

FIG. 6 is a flowchart illustrating a method for using an intelligent digital assistant to interact with and to monitor an HVAC system and its components. An intelligent digital assistant is a task-oriented software agent or application program that understands natural language and completes electronic tasks for a user. The intelligent digital assistant is programmed with artificial intelligence, machine-learning, and voice-recognition technologies.

In step 601, an HVAC system, its components, and/or one or more IAQ devices are identified to an intelligent digital assistant. This may be accomplished, for example, by registering the intelligent digital assistant with a home WiFi network (such as network 112, FIG. 1) and allowing the intelligent digital assistant to automatically detect HVAC system components that are present on or registered with the network, such as a controller or thermostat 110 or IAQ devices 106A-N. Alternatively, the HVAC system components and IAQ devices may be identified manually to the intelligent digital assistant, such as by providing a network identifier or network address for the components and IAQ devices.

In step 602, the intelligent digital assistant begins monitoring the status of the HVAC system components and IAQ devices. The user may notify the intelligent digital assistant when a component is installed so that the lifetime or use of that component can be monitored. In other embodiments, the intelligent digital assistant may issue periodic queries to the HVAC system components and IAQ devices, such as daily or hourly queries for status information. The HVAC system components and IAQ devices return data appropriate for the particular type of device or detector on the device. The response from the HVAC system components and IAQ devices may be, for example, a current pressure differential across a media filter, a current or voltage draw by a UV light, an indication if a ventilation fan or blower is running or not, an amount of time that a ventilation fan or blower has been running, etc.

In step 603, the intelligent digital assistant evaluates the health of the HVAC system components and IAQ devices. This evaluation may be based on an installed lifetime of the component or IAQ device. For example, if the intelligent digital assistant knows how long a particular component has been installed, then the intelligent digital assistant can calculate how long the component has been in use. The intelligent digital assistant can monitor such lifetime use whether or not it is in communication with the component device over the network. Alternatively, data provided by an HVAC component or IAQ device may be used to evaluate the health or effectiveness of that element. For example, the intelligent digital assistant may monitor changes in pressure across a media air filter or changes in current or voltage levels required by a UV light.

In step 604, the intelligent digital assistant determines whether the components or IAQ devices require maintenance or replacement. For example, the intelligent digital assistant may compare a component's actual use against predetermined lifetime limits, such as manufacturer recommendations or a user-defined lifetime duration. Alternatively, performance data, such as the pressure across a media air filter or a UV light's current or voltage level, may be used to determine if the component should be replaced or repaired. For example, the UV light's current level may indicate impending failure once it reaches a certain threshold, which would require repair or replacement.

In step 605, if the components and devices do not need maintenance or replacement, then the process returns to step 602 for continued monitoring. On the other hand, if one or more HVAC components or IAQ devices require replacement or maintenance, then the process moves to step 606 where the intelligent digital assistant notifies the user of the problem and either requests action to take or prompts the user for possible actions. For example, the intelligent digital assistant may notify the user that a component is failing or failed and then suggest ordering a replacement part and scheduling a maintenance professional to install the replacement part. In step 607, the intelligent digital assistant determines if additional action is needed or requested by the user.

The activity in steps 606 and 607 may be accomplished at least in part by a spoken interaction between the intelligent digital assistant and the user. In step 606, the intelligent digital assistant may generate a natural language query or statement that is presented to the user as speech. For example, the intelligent digital assistant may generate the following output, "Homeowner, the air purifier UV light is failing, should I order a replacement and scheduled a technician to install it?" In step 607, the intelligent digital assistant may listen for the user's spoken response and may use natural language processing, speech recognition, or speech-to-text to act upon the user's response.

In other embodiments, the activity in steps 606 and 607 may be accomplished at least in part by a written or text-based interaction between the intelligent digital assistant and the user. For example, some intelligent digital assistant services do not provide a speech-based interface, and instead provide interaction through a text-based interface on a computer, laptop, tablet, or other device. In this scenario, the intelligent digital assistant may generate the same output, "Homeowner, the air purifier UV light is failing, should I order a replacement and scheduled a technician to install it?", but in text form, such as a pop-up text box on a display, or a text, email, or other message. The intelligent digital assistant may then receive the user's instructions in a text-based response.

If no action is required at step 606, then the process moves back to step 602 to continue monitoring the HVAC components and IAQ devices. Otherwise, the process continues to step 608 where the intelligent digital assistant takes the action as directed by the user. In step 608, the intelligent digital assistant may, for example, order replacement parts or supplies or schedule service or maintenance. Step 608 may include additional interaction with the user, such as requesting the user's preferred or alternative times for service, or requesting the user's selection from a list of replacement components. In another embodiment, the intelligent digital assistant automatically places an order for a replacement component and then sends the homeowner a confirmation request for the date and time that a service company has scheduled to install the component.

When the requested action is completed in step 608, the process moves back to step 602 to continue monitoring the HVAC components and IAQ devices.

In other embodiments, in addition to the intelligent digital assistant's periodic evaluation of the health of the HVAC system components and IAQ devices, the user may initiate such an evaluation by requesting the component and/or device status in step 609. The user may initiate an evaluation by querying the intelligent digital assistant for an HVAC status update, such as by asking the intelligent digital assistant for the HVAC status. The process will move to step 603 and will continue as described above to replace any failing or failed parts and to schedule maintenance as needed. In response to a user-initiated evaluation, the intelligent digital assistant may provide additional information in response, such as an estimated remaining lifetime or operational efficiency for some or all of the components or devices.

Although certain embodiments are described herein with reference to specific examples, numerous modifications and changes may be made in light of the foregoing description. Accordingly, the specification and figures are to be regarded in an illustrative rather than a restrictive sense, and all such modifications are intended to be included within their scope. Any benefits, advantages, or solutions to problems that are described herein with regard to specific embodiments are not to be construed as a critical, required, or essential feature or element of any or all the claims. Furthermore, it should be understood that the various operations described herein may be implemented in software, hardware, or a combination thereof. The order in which each operation of a given technique is performed may be changed, and the elements of the systems illustrated herein may be added, reordered, combined, omitted, modified, etc. It is intended that the embodiments described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The term "coupled" is defined as "connected" and/or "in communication with," although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. A system, comprising:
   an Indoor Air Quality (IAQ) component configured to alter the quality of air entering, leaving, or circulating within a building via an HVAC (Heating, ventilation, and/or air conditioning) system, wherein the IAQ component comprises a UV (ultraviolet) light source;
   a component sensor configured to determine properties of the IAQ component, wherein the properties comprise at least one of a voltage and a current drawn by the UV light source;
   a first wireless transmitter coupled to the component sensor, wherein the first transmitter is configured to transmit the properties of the IAQ component;
   an airflow sensor configured to determine airflow properties at a location in the vicinity of the IAQ component;
   a second wireless transmitter coupled to the airflow sensor, wherein the second transmitter is configured to transmit the airflow properties;
   a gateway located within the building and configured to receive the IAQ component properties transmitted by the first wireless transmitter and the airflow properties transmitted by the second wireless transmitter; and
   a personal wireless device configured to receive the IAQ component properties and the airflow properties via the gateway, the personal wireless device comprising a user interface by which the properties of the IAQ component and the airflow properties are reported, wherein the IAQ component properties reported by the user interface comprise expected remaining lifespan information of the UV light source determined based on at least one of the voltage and the current drawn by the UV light source.

2. The system of claim 1, wherein the IAQ component sensor comprises at least one of a voltage detector coupled to a ballast of the UV light source and a current detector coupled to the ballast of the UV light source.

3. The system of claim 1, wherein the airflow sensor is configured to measure airborne components.

4. The system of claim 3, wherein the measured airborne components in the vicinity of the IAQ component are reported via the user interface of the personal wireless device.

5. The system of claim 1, wherein the airflow sensor is configured to measure air pressure in the vicinity of the IAQ.

6. The system of claim 1, wherein the IAQ component further comprises at least one media air filter.

7. The system of claim 1, further comprising a WiFi network, wherein the IAQ component properties are transmitted to the gateway by the first wireless transmitter via the WiFi network and the airflow properties are transmitted by the second wireless transmitter to the gateway via the WiFi network.

8. The system of claim 7, wherein the personal wireless device receives the reported information via the WiFi network.

9. The system of claim 5, wherein a lifespan of the IAQ component is determined based on the measured air pressure, and wherein the lifespan of the IAQ component determined based on measured air pressures is reported via the user interface of the personal wireless device.

10. A personal wireless device, comprising:
    a processor; and
    a memory coupled to the processor, the memory having program instructions stored thereon that, upon execution by the processor, cause the personal wireless device to:
    receive status information from a gateway configured to receive IAQ (Indoor Air Quality) component properties transmitted by a first wireless transmitter and the airflow properties transmitted by a second wireless transmitter, wherein the component properties comprise at least one of a voltage and a current drawn by the IAQ component comprising a UV (ultraviolet) light source;
    report, via a user interface, the received status information, wherein the information reported via the user interface comprises airflow properties transmitted by the second wireless transmitter and further comprises properties of the IAQ component transmitted by the first wireless transmitter, wherein the IAQ component properties reported by the user interface comprise expected remaining lifespan information of the UV light source determined based on at least one of the voltage and the current drawn by the UV light source.

11. The personal wireless device of claim 10, wherein the IAQ component properties are determined by at least one of a voltage detector coupled to a ballast of the UV light source and a current detector coupled to the ballast of the UV light source.

12. The personal wireless device of claim 10, wherein the airflow sensor is configured to measure airborne components.

13. The personal wireless device of claim 12, wherein the measured airborne components in the vicinity of the IAQ component are reported via the user interface of the personal wireless device.

14. The personal wireless device of claim 10, wherein the airflow sensor is configured to measure air pressure in the vicinity of the IAQ component.

15. The personal wireless device of claim 10, wherein the IAQ component further comprises at least one media air filter.

16. The personal wireless device of claim 10, wherein the personal wireless device receives the reported information via a WiFi network.

17. The personal wireless device of claim 16, wherein the IAQ component properties are transmitted to the gateway by the first wireless transmitter via the WiFi network and the airflow properties are transmitted by the second wireless transmitter to the gateway via the WiFi network.

18. The personal wireless device of claim 14, wherein a lifespan of the IAQ component is determined based on the measured air pressure, and wherein the lifespan of the IAQ component determined based on measured air pressures is reported via the user interface of the personal wireless device.

19. A method for altering the quality of air entering, leaving, or circulating within a building via an HVAC (Heating, ventilation, and/or air conditioning) system, the method comprising:

determining properties of an IAQ (Indoor Air Quality) component by a component sensor, wherein the IAQ component comprises a UV (ultraviolet) light source, and wherein the properties comprise at least one of a voltage and a current drawn by the UV light source;

transmitting the properties of the IAQ component to a gateway located within the building;

determining airflow properties at a location in the vicinity of the IAQ component by an airflow sensor;

transmitting the airflow properties to the gateway;

providing, by the gateway, the IAQ component properties and the airflow properties to a personal wireless device; and reporting, via a user interface of the personal wireless device, the IAQ component properties and the airflow properties, wherein the IAQ component properties reported by the user interface comprise expected remaining lifespan information of the UV light source determined based on at least one of the voltage and the current drawn by the UV light source.

\* \* \* \* \*